United States Patent [19]
Feller et al.

[11] Patent Number: 4,885,935
[45] Date of Patent: Dec. 12, 1989

[54] ENGINE TESTING SYSTEM

[75] Inventors: Roger K. Feller, Canton; Samuel R. Warner, Ypsilanti; Janice D. Capriotti, Novi, all of Mich.

[73] Assignee: Ford Motor Company, Dearborn, Mich.

[21] Appl. No.: 211,601

[22] Filed: Jun. 27, 1988

[51] Int. Cl.⁴ .......................................... G01M 15/00
[52] U.S. Cl. ................................................. 73/117.2
[58] Field of Search ................ 73/117.2, 117.3, 118.1; 123/418–420, 436

[56] References Cited

U.S. PATENT DOCUMENTS

| | | | |
|---|---|---|---|
| 4,191,144 | 3/1980 | Nohira et al. | 123/417 |
| 4,242,994 | 1/1981 | Keely | 123/353 |
| 4,275,694 | 6/1981 | Nagaishi | 123/479 |
| 4,344,398 | 8/1982 | Ikeura | 123/339 |
| 4,502,446 | 3/1985 | Kanegae et al. | 123/479 |
| 4,617,898 | 10/1986 | Gayler | 123/470 |
| 4,664,090 | 5/1987 | Kabasin | 73/118.2 |
| 4,696,277 | 9/1987 | Katayama | 73/119 A |
| 4,730,484 | 3/1988 | Olshefski | 73/119 R |
| 4,774,922 | 10/1988 | Morita | 123/425 |
| 4,776,312 | 10/1988 | Yoshioka et al. | 123/436 |

Primary Examiner—Robert R. Raevis
Attorney, Agent, or Firm—Peter Abolins; Keith L. Zerschling

[57] ABSTRACT

An engine testing system tests an engine at the end of a production line by controlling the fuel charge and ignition spark timing of an operating engine as a function of engine speed and air charge. The test is accomplished without the need for mass air flow and manifold absolute pressure sensors.

1 Claim, 3 Drawing Sheets

ENGINE TESTING SYSTEM

BACKGROUND OF THE INVENTION

1. Technical Field

This invention relates to an engine testing system.

2. Background Art

After fabrication of an engine, it is typically desirable to test the engine to insure correct operation. This often Presents difficulties which are not present when the engine is installed in the car. For example, certain sensors needed for engine operation may not yet have been installed. Of course, all missing sensors could be temporarily installed and the engine tested on an engine dynamometer installation. However, such an installation is relatively expensive to maintain, each engine test may take a relatively long time, and the test results are dependent upon sensors which are present only during the test and are not the same ones later installed on the engine. When many engines are being produced, the total time and cost of testing the engines may be substantial.

It would be advantageous to have an engine control system suitable for testing an engine at the end of a production line which is accurate, has reduced cost, and avoids the need for pressure sensors, airflow meters and complex control modules. These are some of the problems this invention overcomes.

SUMMARY OF THE INVENTION

An engine testing system in accordance with an embodiment of this invention has an air charge determination means which generates an indication of engine air charge. The engine testing system further includes a table defining an engine operating parameter as a function of both engine speed and adaptive engine air charge. For example, such a table can be a spark table defining engine ignition spark timing as a function of both engine air charge and engine speed or a fuel multiplier table defining a fuel charge adjustment applied to the engine as a function of both normalized throttle angle and engine coolant temperature. Advantageously, for each table, air charge is defined by throttle angle. Thus an engine testing system in accordance with an embodiment of this invention can provide interactive, adaptive control for spark timing, fuel injection, and idle speed control using throttle angle and engine speed as primary inputs.

As a result, end of line engine testing can be accomplished without the need for mass airflow sensors or manifold absolute pressure sensors. Such engine testing using interactive control of engine operation with adaptive throttle angle and engine speed as primary inputs is available at a relatively low cost. The low cost advantage is obtained, in part, because of the capability for inferring air charge through the measurement of throttle position and avoiding the use of a manifold absolute pressure sensor. Advantageously, the engine testing system does make use of a throttle position sensor, an engine coolant sensor, an idle speed control valve, an ignition system, fuel injectors, a fuel rail and an engine wiring harness.

DETAILED DESCRIPTION OF THE INVENTION

In accordance with an embodiment of this invention, a speed throttle engine testing system 10 (FIG. 1) utilizes throttle angle as a load determination instead of, for example, measured mass air flow or measured manifold vacuum for calculated speed density. The throttle angle is a primary input to the control of spark timing, fuel injection and idle speed. Adaptive strategies are utilized to reduce the need for additional sensors. For example, an adaptive strategy can be based on feedback as a function of minimum throttle position.

Figure 1:
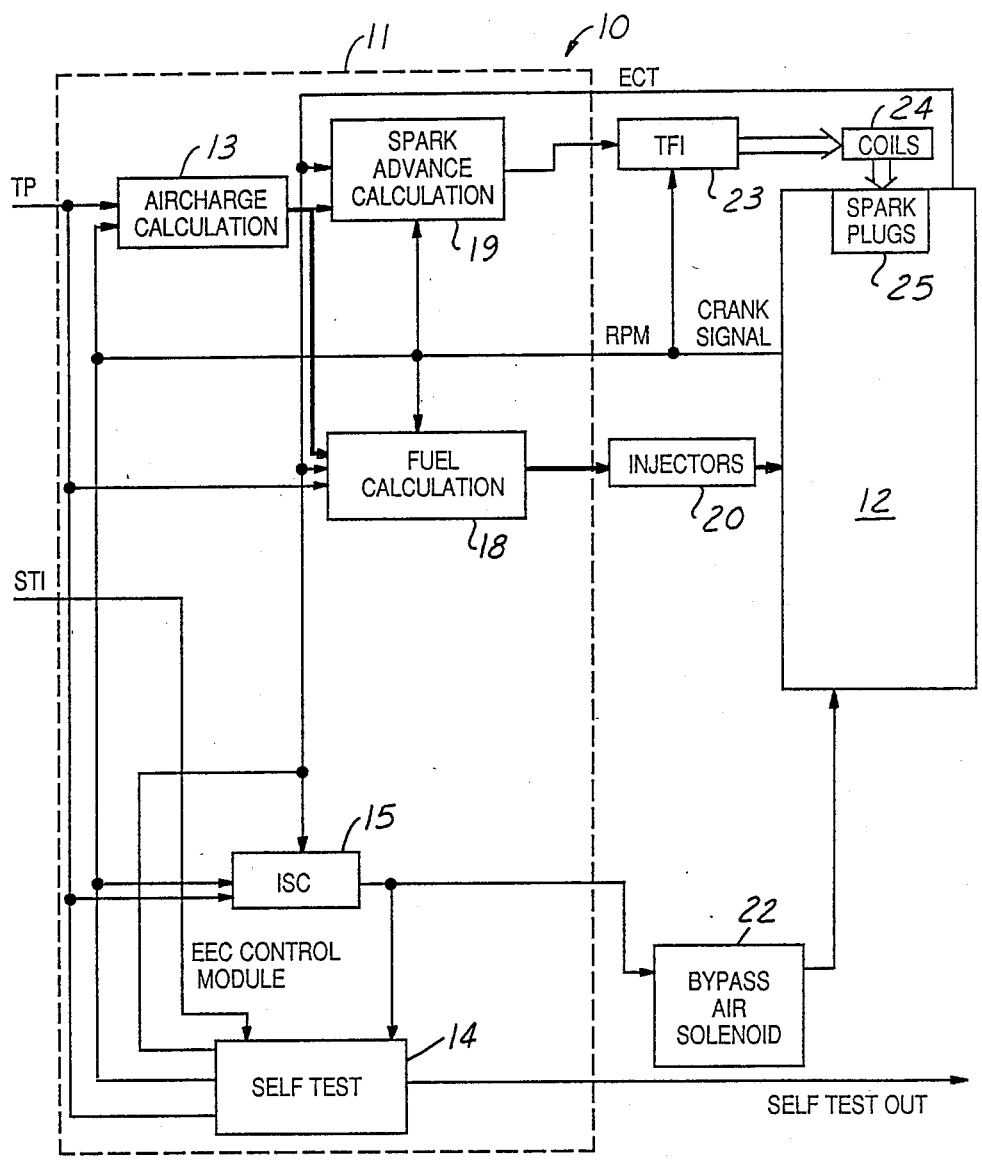
FIG. 1 is a block diagram of an engine testing system in accordance with an embodiment of this invention.

Referring to FIG. 1, speed throttle engine testing system 10 includes an electronic engine control (EEC) module 11 coupled to an engine 12. EEC module 11 includes the following signal processing and storage: air charge calculation module 13, self test module 14, idle speed control (ISC) module 15, fuel calculation module 18 and spark advance calculation module 19.

Fuel calculation module 18 has an output applied to fuel injectors 20 which are coupled to engine 12. If desired, a heated exhaust gas oxygen sensor can be used to provide feedback correction of engine air/fuel ratio. Idle speed control (ISC) module 15 applies a signal to a bypass air solenoid 22 which in turn is coupled to a fuel charging assembly of engine 12. Spark advance calculation module 19 provides an output to a thick film ignition (TFI) module 23 which applies current to ignition coils 24 which in turn are coupled to spark plugs 25 of engine 12. A signal representing engine coolant temperature (ECT) is applied from engine 12 to spark advance calculation module 19, fuel calculation module 18, and idle speed control module 15. A signal representing instantaneous throttle position (TP) is applied to air charge calculation module 13, fuel calculation module 18, and idle speed control module 15.

Figure 2:
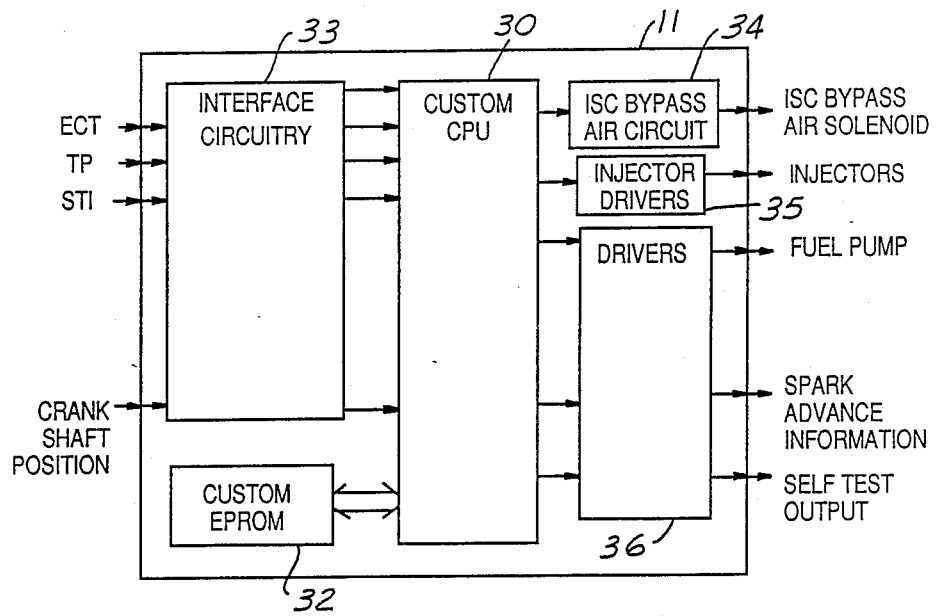
FIG. 2 is a block diagram of a control module portion of FIG. 1, in accordance with an embodiment of this invention.

Referring to FIG. 2, the structure of electronic engine control module 11 is shown in block diagram. A custom central processing unit (CPU) 30 is coupled by two way communication to a custom electrically programmable read only memory (EPROM) 32. Custom CPU 30 is used to store the base spark table and the base fuel table information. CPU 30 receives signals from interface circuitry 33, and supplies signals to an idle speed control (ISC) bypass air circuit 34, injector drivers 35, and auxiliary drivers 36.

Drivers 36 have outputs to a fuel pump, a self test output and spark advance information. Interface circuitry 33 receives signals supplying information characterizing engine coolant temperature (ECT), throttle position (TP), self test input switch (STI), and crankshaft position. Since the engine management system in accordance with an embodiment of this invention uses throttle position for engine load indication, the accuracy of the throttle position sensor is relatively more important than the accuracy of the other sensors. Using adaptive correction, the lowest throttle position reading is assumed to be a closed throttle reading. This closed throttle position reading is used as a base for other throttle position readings indicating how much the throttle is open. Idle speed control bypass air circuit 34 provides a duty cycle output to the idle speed control bypass air solenoid. Injector drivers 35 have an output to fuel injectors.

Figure 3B:
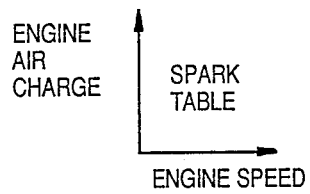
FIG. 3B is a table representing spark advance with respect to engine air charge and engine speed.
Figure 3C:
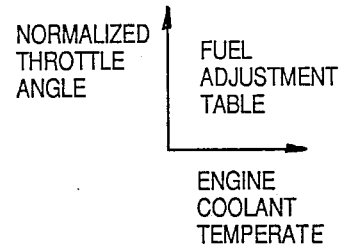
FIG. 3C is a table representing the magnitude of a fuel adjustment to be supplied with respect to normalized throttle angle and engine coolant temperature.
Figure 3A:
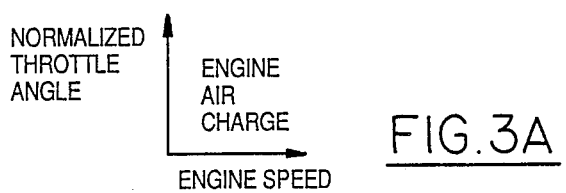
FIG. 3A is a table representing engine air charge with respect to normalized throttle angle and engine speed.

Engine test system 10 (FIG. 1) uses three tables as indicated in FIGS. 3A, 3B and 3C. In FIG. 3A, an engine air charge table is a function of normalized throttle angle and engine speed. When a value for air charge is determined from the table of FIG. 3A, the air charge value is used as one axial input for the table in FIG. 3B. In FIG. 3B, the spark table is a function of engine speed on one axis and of engine air charge on the other axis. In FIG. 3C, a fuel adjustment table is a function of engine coolant temperature and normalized throttle angle.

Figure 4:
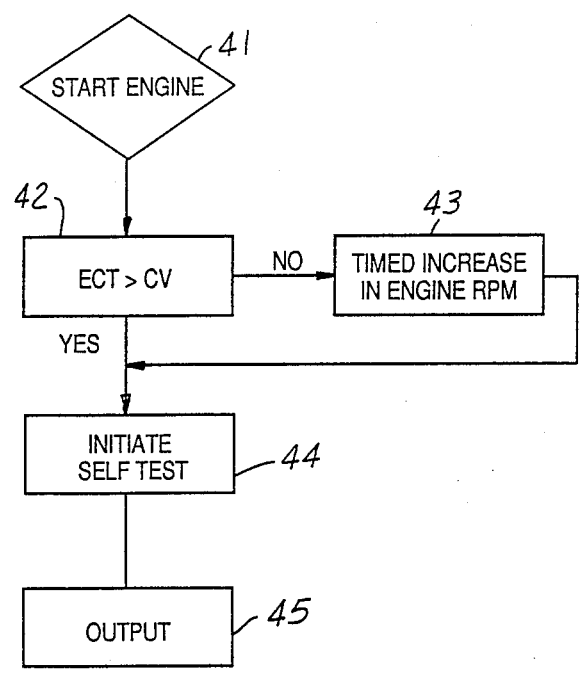
FIG. 4 is a logic flow block diagram of the operation of an engine control system in accordance with an embodiment of this invention.

Referring to FIG. 4, a block diagram illustrates the logic which occurs within (EEC) control module 11 which is coupled to engine 12 during engine testing. Interactive operation of an engine testing control system in accordance with an embodiment of this invention begins at block 41 with START. The logic sequence then goes to a block 42 where an engine warmup is determined by checking to see if the coolant temperature (ECT) is greater than a calibrated value (CV). Advantageously, the engine control strategy for idle speed is such as to run an engine at sufficiently high speeds to increase engine coolant temperature sufficiently fast for a relatively quick engine test. That is, the high speed idle engine operation is extended compared to normal operation of an engine installed in a car. If engine coolant temperature is below the calibrated value, logic flow proceeds to block 43 wherein there is provided an increase in engine speed for a predetermined time duration. If engine coolant temperature is greater than the calibrated value at block 42 or the timed duration of increased engine speed at block 43 has been complete, logic flow goes to a block 44.

Figure 5:
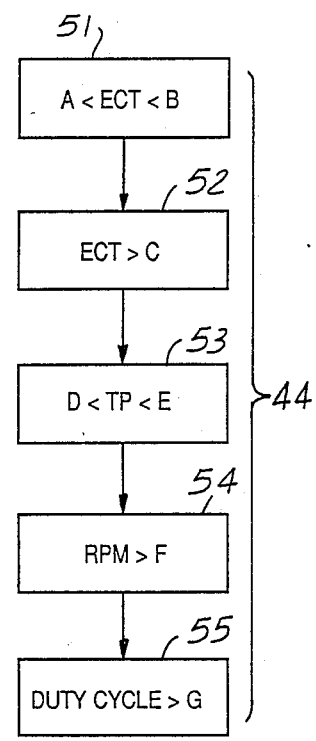
FIG. 5 is a logic flow block diagram of a portion of the logic flow block diagram of FIG. 4.

Referring to FIG. 5, a further breakdown of initiate self-test block 49 includes blocks 51 through 55, wherein various checks are performed and the results stored for output at block 50. Block 51 determines whether or not ECT is within a predetermined temperature range defined by magnitudes A and B. Block 52 determines whether or not ECT is above some predetermined temperature magnitude C. Block 53 determines whether or not throttle position is within a predetermined angular position range defined by angular positions D and E. Block 54 determines whether engine RPM is greater than predetermined magnitude F. Block 55 determines whether or not the duty cycle of the signal applied to the engine idle speed control valve is above a predetermined value G.

During operation of engine test system 10 the initial ECT sensor input determines the RPM at which to run the engine. Engine speed is controlled by the ISC valve. Self test block 49 makes determinations for: (a) ECT and TP outside the range of predetermined limits, (which may indicate either a fault in the engine electrical wiring harness or in the sensor itself); (b) ECT too low, (which may indicate that the sensor is faulty); (c) idle engine speed too low, (which may indicate that the ISC valve does not function or there is a fault in the engine wiring harness); (d) ISC duty cycle too low, (which may indicate that undesired air is being drawn in, e.g. a vacuum leak or a throttle plate that was not adjusted properly). Accordingly, engine testing system 10 allows the running of different types of engines with one single relatively low cost engine test system and verifies the integrity and functionality of the engine, engine wiring harness, ECT and TP sensors as well as idle speed control valve operation.

Various modifications and variations will no doubt occur to those skilled in the art to which this invention pertains. For example, the particular engine test module functional structure can be varied from that disclosed herein. These and all other variations which basically rely on the teachings through which this disclosure has advanced the art are properly considered within the scope of this invention.

We claim:

1. A method for controlling engine operation during end of production line engine testing including the steps of:

determining the air charge of the engine by sensing engine speed and by sensing the throttle angle of the engine;

determining a desired engine operating parameter as a function of engine speed and air charge of the engine;

operating the engine as a function of the determined desired engine operating parameter;

determining if the engine coolant temperature is greater than a predetermined value;

establishing the engine is operating at idle state by determining if the engine is operating at a steady state and determining if the throttle angle of the engine is stable, at closed throttle, and if the engine speed is stable; and initiating self test of the engine by;

determining if engine coolant temperature is within a predetermined temperature range;

determining if engine coolant temperature is above a predetermined temperature magnitude;

determining if throttle angle magnitude is within a predetermined range;

determining if engine idle speed is greater than a predetermined magnitude; and determining if the duty cycle of a signal applied to an engine idle speed control valve is above a predetermined value.

* * * * *